United States Patent
Janky et al.

(10) Patent No.: US 6,268,804 B1
(45) Date of Patent: Jul. 31, 2001

(54) DYNAMIC MONITORING OF VEHICLE SEPARATION

(75) Inventors: James M. Janky, Los Altos; Derek Steven Smith, Sunnyvale; John F. Schipper, Palo Alto, all of CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/523,830

(22) Filed: Mar. 13, 2000

Related U.S. Application Data

(62) Division of application No. 08/993,693, filed on Dec. 18, 1997, now Pat. No. 6,067,031.

(51) Int. Cl.$^7$ .................................................. G08G 1/16
(52) U.S. Cl. .................... 340/903; 340/435; 340/904; 180/169; 342/72; 367/909
(58) Field of Search .................... 340/903, 435, 340/436, 901, 904; 180/169, 167, 168, 170; 342/70, 71, 72; 367/909, 112, 96, 97, 107

(56) References Cited

U.S. PATENT DOCUMENTS

| | | | |
|---|---|---|---|
| 5,574,644 | * | 11/1996 | Butsuen et al. ................ 364/426.04 |
| 5,689,245 | * | 11/1997 | Noreen et al. ................. 340/825.49 |
| 5,798,911 | * | 8/1998 | Josic ...................................... 362/66 |
| 5,959,552 | * | 9/1999 | Cho ..................................... 340/903 |

* cited by examiner

*Primary Examiner*—Nina Tong
(74) *Attorney, Agent, or Firm*—John F. Schipper

(57) ABSTRACT

A system for monitoring operation and location of a first moving vehicle relative to a second moving vehicle. A minimum separation distance between the first and second vehicles is estimated, based on the first vehicle velocity, and optionally on the second vehicle velocity, using location determination (LD) signals received from satellite-based transmitters from GPS, GLONASS and LEO satellites, or from ground-based signal sources such as LORAN signal towers, and using ranging signals from SONAR, RADAR or a similar system. The minimum separation distance is compared with the actual separation distance at selected times, and a vehicle driver is advised if the actual separation distance is too small, if the separation distance is decreasing too quickly, or if the second vehicle velocity is decreasing too quickly. The second vehicle may travel in the same traffic lane, in an adjacent lane, or on a road that intersects the road used by the first vehicle. Where the first and second vehicles travel on separate roads that will intersect, the system estimates whether the second vehicle will stop, or will be able to stop, at the intersection. The second vehicle may be a railroad car, such as a locomotive, or a road vehicle. A maximum vehicle clear-view velocity, consistent with vehicle stopping within a selected distance, is estimated. Road conditions are estimated and compensated for in estimating the minimum separation distance and/or the maximum vehicle clear-view velocity.

28 Claims, 8 Drawing Sheets

DYNAMIC MONITORING OF VEHICLE SEPARATION

This is a divisional of application Ser. No. 08/993,693 filed on Dec. 18, 1997, now U.S. Pat. No. 6,067,031.

FIELD OF THE INVENTION

This invention relates to dynamic monitoring of a separation zone surrounding a moving vehicle, from which other vehicles are to be excluded.

BACKGROUND OF THE INVENTION

A moving vehicle, such as an automobile, truck, bus, motorcycle or railroad car, requires at least a minimum braking distance to stop after vehicle brakes are applied and an additional time and equivalent perception-reaction distance for the vehicle driver to perceive and/or react and to apply the brakes. Each of the braking distance and the perception-reaction distance increases with vehicle velocity and may be different for different vehicles and for different drivers. Where a first vehicle immediately follows a second vehicle in a traffic lane on a highway, expressway, street, lane or road ("road"), safe operation of the first vehicle requires keeping some distance between the first and second vehicles. Many drivers use an approximately fixed separation distance from the preceding vehicle, and this distance (often as small as two vehicle lengths) does not vary with vehicle velocity, with the type of vehicle, with road conditions or with the driver.

Monitoring of vehicle velocities, vehicle spacings and the like, that control access to a specified zone, is disclosed in several U.S. patents. Most of these patents do not concern separation of two consecutive vehicles with reference to the individual velocities of the two vehicles.

What is needed is a system for creating and subsequently monitoring a variable vehicle-to-vehicle buffer zone or separation distance whose location moves with the vehicle and whose size and/or character can change with vehicle velocities, with road conditions and with other variables. Preferably, the system should determine and take account of the velocities of each of the two vehicles and should permit receipt of information, received from a central station or elsewhere, that may affect determination of the size of the vehicle buffer zone.

SUMMARY OF THE INVENTION

These needs are met by the invention, which provides a system that uses location determination (LD) signals, ranging signals, road condition information and other information, received at the monitored vehicle, (1) to determine the present location and present velocity of the monitored vehicle and of the immediately preceding vehicle in the same road lane, (2) to determine a suitable minimum vehicle-to-vehicle separation distance for two vehicles traveling in the same road lane and to optionally display this distance, visually or audibly, to the driver, (3) to compare the minimum separation distance with the actual separation distance and to advise the driver if the monitored vehicle is too close to the immediately preceding vehicle, (4) to determine a maximum clear-view vehicle velocity, and (5) to take account of road conditions and other changing circumstances that may alter the minimum separation distance or maximum clear-view velocity.

The monitored vehicle carries, or has attached thereto, an LD module that receives LD signals and estimates the present location and velocity of the LD module and that estimates the present location and present velocity of a vehicle, if any, that immediately precedes the monitored vehicle in the same road lane and moves in the same direction. The LD module may include a communications module that exchanges information with a central station.

DETAILED DESCRIPTION OF THE INVENTION

The present invention hereby incorporates herein by reference the related application by the same inventors titled "Dynamic Monitoring of Vehicle Separation", filed with the U.S. Patent and Trademark Office on Dec. 18, 1997 as U.S. patent application No. 08/993,693, and issued on May 23, 2000 as U.S. Pat. No. 6,067,031.

Figure 1:
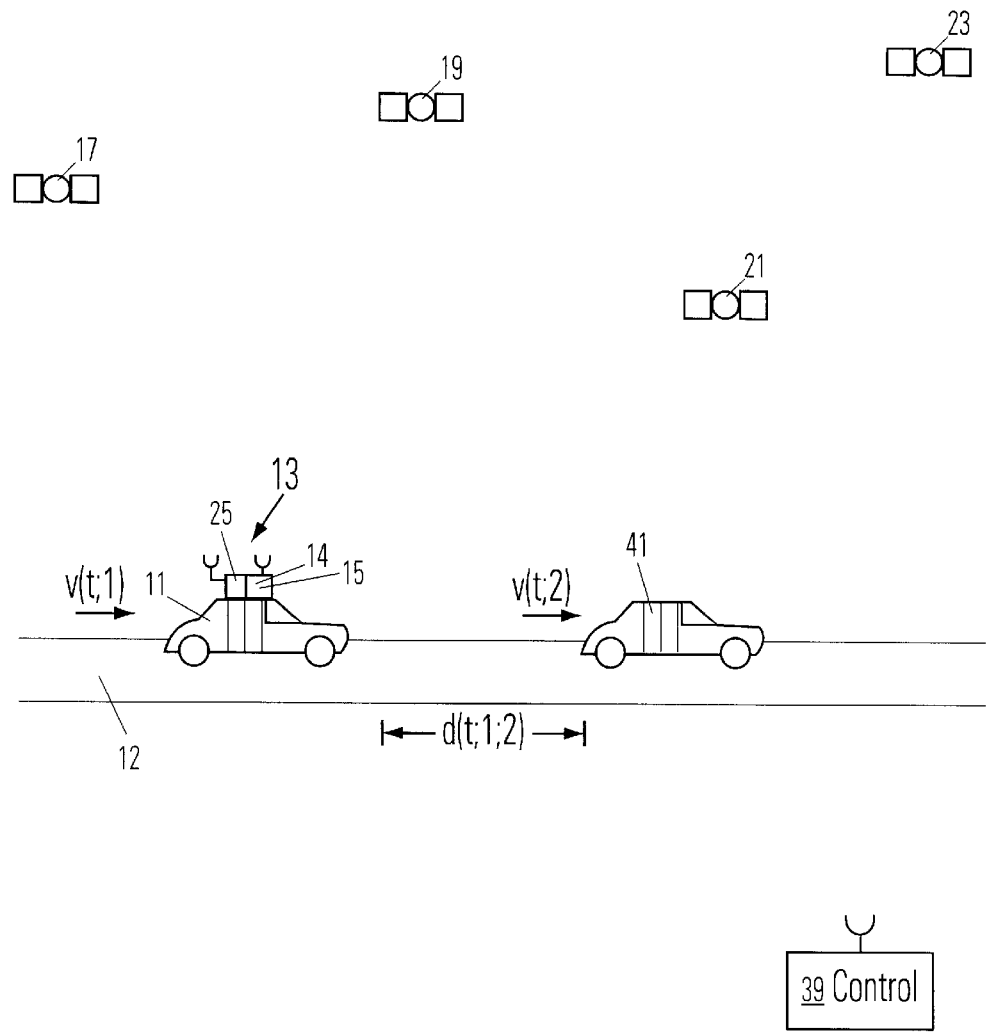
FIGS. 1 and 3 illustrate practice of the invention in two embodiments.

FIG. 1 illustrates one situation for practice of the invention. A monitored or first vehicle 11 moves in a traffic lane on a road, following an immediately preceding, second vehicle 41. The first vehicle 11 carries or has attached thereto a location determination (LD) module 13 that receives LD signals from two or more LD signal sources 17, 19, 21 and 23 and that analyzes these signals to determine the present location vector $r(t;1)$ and the present velocity vector $v(t;1)$ for the first vehicle as a function of time t. The LD module 13 may include an LD unit with an LD signal antenna 14 and associated LD signal receiver/processor 15 that receive and analyze the LD signals. The LD signal sources may be satellite-based transmitters that are part of a Global Positioning System (GPS), a Global Orbiting Navigation Satellite System (GLONASS) or a Low Earth Orbit (LEO) system, such as the 66-satellite Motorola Iridium system. Alternatively, the LD signal sources may be part of a ground-based transmitter system, such as Loran, Tacan, Decca, Omega, JTIDS Relnav or an FM subcarrier system. Optionally, the LD module 13 includes a communications receiver or transceiver 25 (FIG. 2) that can exchange information with a central station 39 that is spaced apart from the vehicle 11. Optionally, the LD module 13 includes a visually perceptible display 29 and/or an audibly perceptible display 31, shown in FIG. 2, that present information for the driver of the first vehicle 11. Optionally, the LD module 13 includes a data/command entry module 33 (e.g., a keyboard or microphone) for entry of responses or supplementary information into the LD module.

Optionally, the communications, control and display functionalities can be built into the vehicle 11 (for example, in the dashboard facing the vehicle operator) as OEM equipment, can be retrofitted into the vehicle and its computer system, or can be incorporated into software for a personal computer that is installed into or removable from the vehicle and that may have been originally intended to provide other vehicle-related functions, such as inside/outside temperature monitoring, radio entertainment, monitoring of fuel usage, and the like. These uses are discussed in the following in connection with the apparatus shown in FIG. 2.

The invention is used to determine and present a minimum separation distance d(t;1;2;sep) between the first vehicle 11 and the second vehicle 41 that travels immediately ahead of the first vehicle in the same traffic lane of the road, as illustrated in FIG. 1. A minimum separation distance will depend upon the present velocity of the first vehicle and optionally upon the present velocity of the second vehicle 41 and/or on the road conditions, and may depend upon the number, ages and present health of any passengers that are traveling in the first vehicle and/or upon other relevant circumstances.

Figure 2:
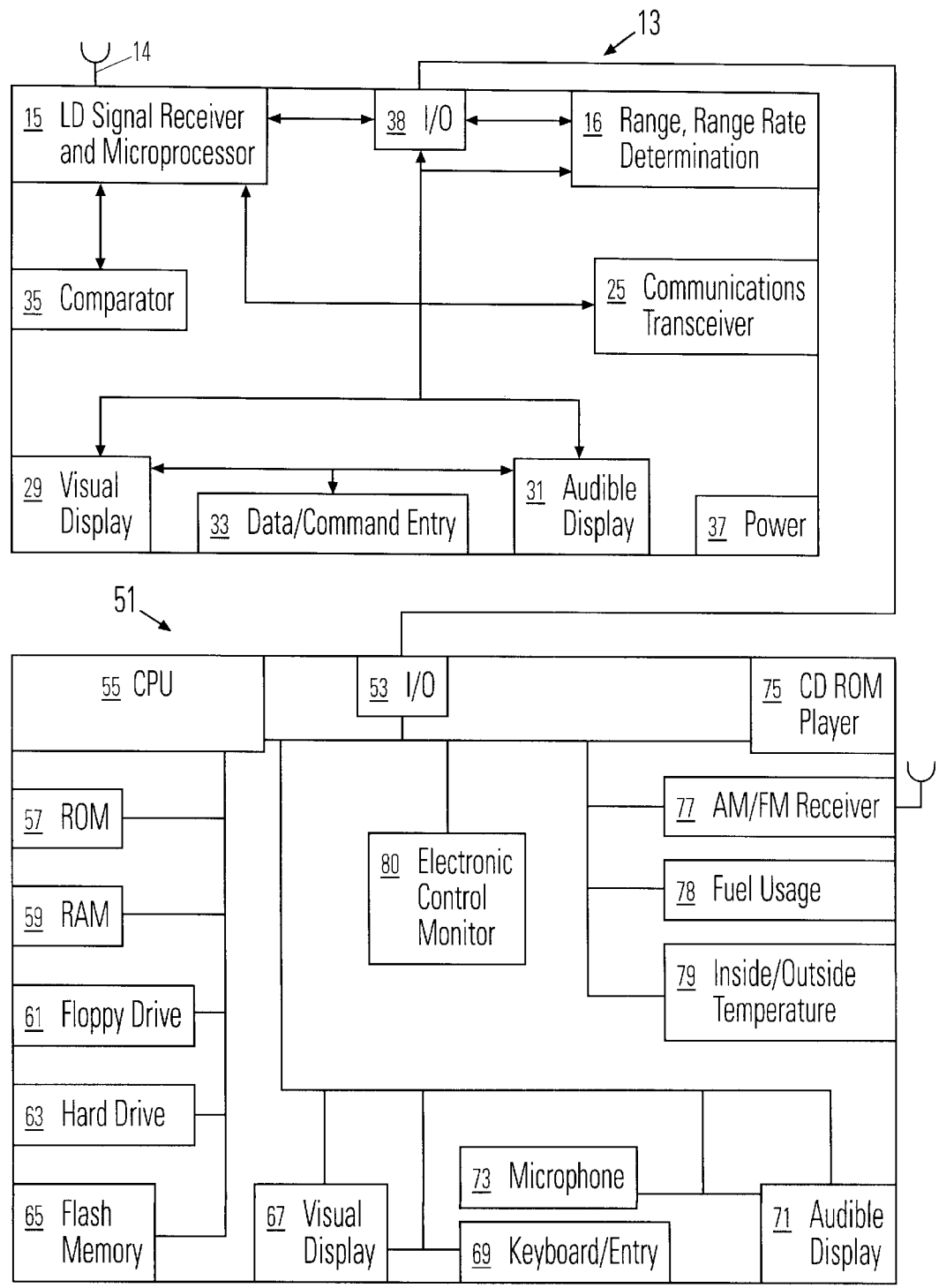
FIG. 2 is a schematic view of apparatus for practicing the invention.

FIG. 2 is a schematic view of an LD module 13, carried on the first vehicle 11, suitable for monitoring and reacting to the vehicle-to-vehicle separation according to the invention. The apparatus 13 may include an LD signal antenna or sensor 14 and associated LD signal receiver/processor 15 that receive and analyze LD signals from two or more LD signal sources and determine the present location vector r(t;1) and present velocity vector v(t;1) of a first vehicle. The LD module 13 also includes a range and (optional) range rate determination module 16, referred to for convenience as a "ranging" module, which may act cooperatively with, or be part of, the LD signal receiver/processor 15, that determines the separation distance d(t;1,2) between the first vehicle and a second vehicle that immediately precedes the first vehicle in the same traffic lane of the road. Optionally, the ranging module 16 determines a velocity vector v(t;2) of the second vehicle and/or a velocity difference vector $\Delta v(t;1;2)$ of the first vehicle relative to the second vehicle.

The ranging module 16 may use range determination apparatus disclosed in U.S. Pat. No. 5,379,045, issued to Gilbert, Kersey and Janky for "SATPS Mapping Angle Orientation Calibrator", or in U.S. Pat. No. 5,568,152, issued to Janky, Loomis and Schipper for "Integrated Image Transfer For Remote Target Location", both incorporated by reference herein. Each of these two patents discloses methods and apparatus for determining the angular direction to and/or the distance to a remote, visible object relative to an LD unit, such as a GPS unit including a GPS signal antenna and GPS signal receiver/processor. Alternatively, the ranging module 16 may use any other suitable range determination apparatus, such as a conventional automated rangefinder and time-based range sampler. Alternatively, the LD module 13 may include a speedometer/odometer with a wheel revolution sensor mounted on a vehicle wheel, a local magnetic field sensor with time-based sensor sampler (disclosed in U.S. Pat. NoS. 3,860,869 and 4,743,913, issued to Parks and to Takai), or the like.

A preferred alternative for the ranging module 16 is a SONAR system, which can determine a distance and a closure rate and even an object size, between a vehicle and an object spaced apart from the vehicle. A SONAR (sound navigation and ranging) system transmits sonic or supersonic waves and determines time of arrival of the return waves (reflected from a visible object) to determine distance to the reflecting object, analogous to a radar system. SONAR waves normally have a carrier frequency of 10–50 kHz (equivalent wavelength=0.66–3.3 cm) but may have a higher carrier frequency. The directional pattern of the transmitter/receiver can be used to determine a heading angle for the object, and the return wave pattern can be used in some circumstances to estimate the effective reflecting area of the object. By comparing two consecutive range measurements from return waves, a range rate or closure rate for the object can be estimated.

Alternatively, a side-looking or conventional RADAR system can be used for a ranging module 16. The operating principles of RADAR are well known and are discussed by M. J. Skolnick in *Radar Handbook*, Second Edition, 1990.

The LD module 13 estimates a minimum separation distance d(t;1;2;sep) between the first and second vehicles, based on the magnitude, $v(t;1)=|v(t;1)|$, of the first vehicle velocity vector, and compares the separation distances d(t;1;2) and d(t;1;2;sep), as discussed in the following. Alternatively, the LD module 13 determines the minimum separation distance d(t;1;2;sep) based on the magnitudes, v(t;1) and v(t;2), of the velocity vectors of the first and second vehicles, as discussed in the following. Road conditions may be taken into account in estimating the minimum separation distance d(t;1;2;sep).

The LD module 13 also includes a comparator 35 that computes difference functions, such as $\Delta(t;1;2)=d(t;1;2;sep)-d(t;1;2)$, and determines if this difference function is (i) greater than or equal to zero or (ii) less than zero. If $\Delta(t;1;2) \geq 0$, the operator of the first vehicle is advised, using a visually perceptible display 29 or an audibly perceptible display 31, of this condition and can take appropriate action. Optionally, the comparator module 35 also determines the time rate of change, $\partial \Delta(t;1;2)/\partial t$, of the difference function $\Delta(t;1;2)$. If $\Delta(t;1;2) \geq 0$ but $\partial \Delta(t;1;2)/\partial t$ is greater than or equal to a selected positive threshold rate v1, the driver of the first vehicle 11 is advised that the separation distance d(t;1;2) is decreasing and will soon become less than the minimum separation distance; the driver can take appropriate action. Optionally, the comparator 35 compares the present vehicle velocity with a computed maximum vehicle velocity.

A visual display 29, illustrated in FIG. 2, that is part of the LD module 13, is connected to the LD signal receiver/processor 15 and may visually advise the driver of the first vehicle 11 to which the LD module 13 is attached of any or all of the following information on a visual display screen: (1) a map of the relevant part of the road and the present separation distance d(t;1;2), preferably in a contrasting color or cross-hatched area; (2) the first vehicle's present location vector r(t;1) and/or velocity vector v(t;1); (3) the second vehicle's present location vector r(t;2) and/or velocity vector v(t;2); (4) a difference $\Delta(t;1;2)=d(t;1;2;sep)-d(t;1;2)$ between the minimum separation distance and the actual separation distance for the first and second vehicles; and (5) relevant information concerning road conditions or special circumstances that are present. These road conditions include, but are not limited to, road surface conditions, local weather conditions and whether the vehicle is operating in daylight or in the nighttime.

An audible display 31, illustrated in FIG. 2, that is part of the LD module 13, is connected to the LD signal receiver 15 and may audibly advise the driver of the first vehicle 11 to which the LD module 13 is attached of any or all of the same information as set forth for the visual display 29. Visual or audible display of the restricted activity time interval may be repeated at periodic intervals, such as once every 15–180 sec, before the beginning of this buffer activation time interval. The visual display 29 or audible display 31 optionally includes a keyboard, microphone or other data/command entry device 33 that can be used to enter relevant information or a request for display of particular information related to determination of the minimum separation distance.

The LD module also includes a power module 37 and an input/output ("I/O") module 38 (a collection of I/O ports)

that can exchange signals with a supplementary service module 51, also illustrated in FIG. 2.

The supplementary service module 51 (optional) includes an I/O module 53, a central processing unit ("CPU") 55 for an on-board computer, and a ROM unit 57, RAM unit 59, floppy drive unit 61, hard drive unit 63 and flash memory unit 65 (optional) that serve the CPU. The supplementary service module 51 optionally includes a visual display 67 and a data/command entry device 69, such as a keyboard, light pen pressure pen or touch screen, that is used to enter a command or a request for information or relevant data requested by the CPU. The supplementary service module 51 optionally includes an audible display 71, such as a loudspeaker, and an audible data/command entry device 73, such as a microphone with or without voice recognition capability (hardware or software). The supplementary service module 51 optionally includes a CD ROM player 75, an AM/FM receiver 77, a fuel usage monitor 78 and/or inside/outside temperature monitor 79. The supplementary service module 51 can be as small as 10 cm×17 cm×2.5 cm, as are the Toshiba Libretto, Philips Velo and other notebook computers now available in the market place and may exercise control through an electronic control monitor 80. These notebook examples are given to illustrate existing technology that permits reduction in size of the service module 51 and/or the LD signal module to a size that can easily be positioned in a vehicle dashboard, or elsewhere if desired. The LD signal module 13 and/or the supplementary module 51 can be OEM electronics equipment for the vehicle or can be redesigned and/or repackaged for rertofitting into the vehicle 11, as desired. The supplementary service module 51 may provide one or more additional functions, such as navigation, entertainment, temperature and fuel usage monitoring, in addition to the function of monitoring minimum vehicle separation distances and/or maximum vehicle velocities. The CPU 55, ROM, RAM, FD, HD and/or flash memory may be part of the LD signal receiver/processor 15 or may be part of a separate computer.

The communications signals used by the transceiver 25 for exchange of inquiries and information between an LD module 13 and a central station 39 may be part of an analog cellular system (such as AMPS or NAMPS), a digital cellular system (such as IS-54 or IS-95), a cellular digital packet data system, a personal communications services (PCS) system, a Digital European Cordless Telecommunications (DECT) system, a radiopaging system, a nationwide wireless network, a conventional land mobile radio system, radio data networks (such as ARDIS and RAM Mobile Data), Metricom's Ricochet Micro Cellular Data Network, a radiofrequency or infrared WAN, an analog or digital microwave relay system, a geostationary satellite system, or a low earth orbit (LEO) system, among others. These communication systems are summarized by S. D. Elliott and D. J. Dailey in *Wireless Communications for Intelligent Transportation Systems*, Artech House, Boston, 1995, pp. 11–32, and are discussed in greater detail in the remainder of this book. The communications signals may also be part of a Group Special Mobile (GSM) pan-European system, as discussed by D. M. Balston and C. Watson in *Cellular Radio Systems*, ed. by D. M. Balston and R.C.V. Macario, Artech House, Boston, 1993, pp. 153–206.

Table 1 includes data taken from a Skid Chart compiled by Michael J. Shepston & Associates, Traffic Accident Reconstruction, Cave Creek, Ariz. 85331. Table 1 provides estimates of perception-reaction distance (conservatively assuming a driver perception-reaction time of 1.5 sec. at any velocity), braking distance and total stopping distance (sum of columns 2 and 3) for a passenger vehicle initially traveling at various velocities, as gathered and analyzed by various highway monitoring groups. The Total Stopping Distance set forth in Table 1 represents a suitable separation distance for two vehicles traveling in the same lane and in the same direction on dry pavement. The results set forth in Table 1 may be modified by taking account of road surface condition (dry, slightly wet, wet/saturated, snow, ice, sleet, etc.) on braking distance.

TABLE 1

Representative Vehicle Stopping Distances

| Vehicle Velocity | Percep-React Distance | Braking Distance | Total Stopping Distance |
|---|---|---|---|
| 10 (m.p.h.) | 22 (feet) | 5 (feet) | 27 (feet) |
| 20 | 44 | 19 | 63 |
| 30 | 66 | 43 | 109 |
| 40 | 88 | 76 | 164 |
| 50 | 110 | 119 | 229 |
| 60 | 132 | 172 | 304 |
| 70 | 154 | 234 | 388 |
| 80 | 176 | 305 | 481 |
| 90 | 198 | 386 | 584 |

A general model for vehicle deceleration upon braking assumes that loss of vehicle velocity v is proportional to a pth power of velocity, viz.

$$dv/dt = -K' \cdot v^p, \qquad (1)$$

where K' and p are parameters that should be determined by measurement. Assuming that $p \neq +1$ (a special case), this model has the following solutions for velocity and linear displacement.

$$v(t) = \{v0^{1-p} - (1-p)K(t-t0)\}^{1/(1-p)}, \qquad (2)$$

$$v(t=t0) = v0, \qquad (3)$$

$$x(t) = x0 + (1/K(2-p))\{v0^{2-p} - \{v0^{1-p} - (1-p)K(t-t0)\}^{(2-p)/(1-p)}\}, \qquad (4)$$

$$x(t=0) = x0. \qquad (5)$$

If vehicle braking is applied at t=t0, the vehicle will come to a stop at the end of a time interval of length $$\Delta t(\text{brake}; v0) = t(\text{stop}) - t0 = (v0)^{1-p}/K(1-p), \qquad (6)$$

and the braking distance will be $$\Delta x(\text{brake}; v0) = x(\text{stop}) - x0 = (v0)^{2-p}/K(2-p). \qquad (7)$$

If kinetic energy is assumed to be lost at a constant rate throughout the braking interval, p=−1 and the braking distance $\Delta x(\text{brake})$ is proportional to $v0^3$. If momentum is assumed to be lost at a constant rate throughout the braking interval, p=0 and the braking distance $\Delta x(\text{brake})$ is proportional to $v0^2$.

Most tabular estimates of braking distance, including the results presented in Table 1, appear to incorporate the assumption that p=0. It is preferable, where possible, to estimate the value of the parameters p and K using measurements on a given vehicle. For example, if the braking distance $\Delta x(\text{brake}; v0)$ is known for two distinct non-zero initial velocities v0' and v0", the parameter p may be estimated using the equation $$p = \log_a\{\Delta x(\text{brake}; v0')/\Delta x(\text{brake}; v0")\}/\log_a\{v0'/v0"\}, \qquad (8)$$

where a is any real number greater than 1.0, such as a=2, a=e≈2.718282 and a=10. Using this estimate, one can easily verify that p≈0 is assumed for the results presented in Table 1.

These considerations can be used to provide an arguably more realistic determination of minimum separation distance, using knowledge of the velocities v(t;1) and v(t;2) for the first and second vehicles. Assume that the first vehicle 11 is traveling at a present velocity v(t;1), behind a second vehicle 41 that is traveling at a present velocity v(t;2) in the same traffic lane and that is proceeding in the same direction, as illustrated in FIG. 1. At a given time, taken to be t=t0=0 for ease of notation, the brakes on the second vehicle 41 are abruptly applied, and the second vehicle comes to a stop after traveling an additional distance $\Delta x$(brake;v20), due solely to vehicle braking. Here, v10 and v20 are the initial velocities of the respective first and second vehicles 11 and 41. Perception-reaction time for the second vehicle 41 is ignored here, because the driver of the first vehicle 11 will only react after the driver observes that the second vehicle is braking. However, the driver of the first vehicle 11 will have a non-zero perception-reaction time $\Delta t$(percep;1). During the time interval $0 \leq t \leq \Delta t$(percep;1) the first vehicle 11 will travel a distance $$\Delta x1(\text{percep};v10) = v10 \cdot \Delta t(\text{percep};1). \tag{9}$$

From Eq. (2), the second vehicle 41 is estimated come to a complete stop at a time $$\Delta t = \Delta t(\text{brake};v20) = (v20)^{1-p}/K(1-p), \tag{10}$$

after traveling an additional braking distance $$\Delta x2(\text{brake}) = (v20)^{2-p}/K(2-p). \tag{11}$$

The first vehicle 11 is estimated to come to a complete stop at a time $$\Delta t1 = \Delta t1(\text{brake};v10) + \Delta t1(\text{percep};1) = (v10)^{1-p}/K(1-p) + \Delta t(\text{percep};1), \tag{12}$$

after traveling an additional total stopping distance of $$\Delta x1 = (v10)^{2-p}/K(2-p) + v10 \cdot \Delta t(\text{percep};1). \tag{13}$$

The difference $$d = \Delta x1 - \Delta x2 = (v10)^{2-p}/K(2-p) - (v20)^{2-p}/K(2-p) + v10 \cdot \Delta t(\text{percep};1) \tag{14}$$

if non-negative, is the minimum separation distance that is appropriate for this situation. At any time t before the second vehicle 41 begins braking, the "initial" velocities v10 and v20 are the present velocities v(t;1) and v(t;2) for the two vehicles, and the minimum separation distance d(t;1;2;sep) between the two vehicles becomes $$d(t;1;2;\text{sep}) = \Delta x1(t) - \Delta x2(t) = \{(v(t;1))^{2-p} - (v(t;2))^{2-p}\}/K(2-p) + v(t;1) \cdot \Delta t(\text{percep};1). \tag{15}$$

The parameters p and K for the first vehicle and for the second vehicle may differ. If the parameter p=0 for both vehicles, Eq. (15) becomes $$d(t;1;2;\text{sep}) = \{(v(t;1))^2 - (v(t;2))^2\}/2K + v(t;1) \cdot \Delta t(\text{percep};1). \tag{15'}$$

Equation (13) or (14) may be implemented to provide adaptive cruise control for appropriate separation of the first vehicle 11 from another vehicle 41 traveling ahead of the first vehicle in the same lane. In a pessimistic approach, the term $-(v20)^{2-p}/K(2-p)$ is ignored, and Eq. (13) is used to determine the minimum first vehicle-to-second vehicle separation distance d(t;1;2;sep). In a less pessimistic, more realistic approach, Eq. (14) is used to determine the minimum separation distance d(t;1;2;sep) between the two vehicles 11 and 41. Whichever approach (Eq. (13) or Eq. (14)) is used, the minimum separation distance d(t;1;2;sep) is computed, displayed visually or audibly (optional), and compared with the present separation distance d(t;1;2).

The quantity d(t;1;2) is computed approximately periodically, for example, once every 1–5 seconds, using the preceding analysis and the measured present values of vehicle velocities, v(t;1) and v(t;2), and this minimum separation distance is compared with the measured present separation distance d(t;1;2) between the two vehicles. If the difference $$\Delta(t;1;2) = d(t;1;2;\text{sep}) - d(t;1;2) \tag{16}$$

is non-negative, or if the difference $\Delta(t;1;2)$ is negative but is increasing at greater than a selected threshold rate v1, $$\partial \Delta(t;1;2)/\partial t > v1, \tag{17}$$

(i) the driver of the first vehicle 11 is advised to increase the separation distance d(t;1;2) between the first and second vehicles, or to decrease the velocity v(t;1) of the first vehicle; or (ii) the system automatically applies the brakes at the first vehicle to increase the actual separation distance d(t;1;2). If the difference $\Delta(t;1;2)$ is negative and its time derivative does not satisfy Eq. (17), the system continues to monitor the relevant variables.

In the unlikely event that the parameter p=+1, the solutions for velocity and linear displacement, analogous to Eqs. (2) and (4), become $$v(t) = v0 \exp\{-K(t-t0)\}, \tag{18}$$

$$x(t) = x0 + (v0/K)\{1 - \exp\{-K(t-t0)\}\}. \tag{19}$$

The minimum separation distance d(t;1;2;sep) becomes $$d(t;1;2;\text{sep}) = \{v(t;1) - v(t;2)\}(v(t;1)/K) + v(t;1) \cdot \Delta t(\text{percep};1), \tag{20}$$

by analogy with Eq. (15).

The formalism developed in Eqs. (1)–(7) can also be used to estimate when the second vehicle is decelerating rapidly without the second vehicle's brake light indicating such deceleration. A change in velocity of the second vehicle may be estimated by the relation $$\partial v(t;2)/\partial t = \partial^2 d(t;1;2)/\partial t^2 + \partial v(t;1)/\partial t, \tag{21}$$

where the first term on the left is computed using the system's measurement of the separation distance d(t;1;2) and the second term on the left is computed using velocity measurements made by the LD unit 13 attached to the first vehicle. If the relation $$\partial v(t;2)/\partial t \leq -v2, \tag{22}$$

where v2 (>0) is a selected threshold acceleration value, such as 5 meter/sec², the system concludes that the second vehicle is decelerating rapidly, independent of whether the second vehicle brake lights appear. If Eq. (22) is satisfied, the system can either (i) advise the driver of the first vehicle that the second vehicle is now decelerating rapidly and allow the first vehicle driver to quickly respond or (ii) automatically apply the brakes of the first vehicle to reduce the velocity of the first vehicle toward zero, without waiting for the first vehicle driver to apply the brakes.

The preceding formalism can also be used to estimate a maximum clear-view vehicle velocity v(t;D;max) that is consistent with stopping a vehicle within a selected clear-view stopping distance D, which may be a vehicle-tovehicle separation distance or a representative visual distance where the vehicle is operated in heavy fog or under other inclement weather conditions that severely reduce visibility. Equation (13) may be re-expressed in the form $$(v(t;1))^{2-p}/K(2-p)+v(t;1)\cdot \Delta t(\text{percep};1)-D \leq 0. \quad (23)$$

If the parameter p=0, corresponding to constant momentum loss during braking, Eq. (23) becomes a quadratic equation, $$(v(t;1))^2/2K+v(t;1)\cdot \Delta t(\text{percep};1)-D \leq 0, \quad (24)$$

which has a solution $$v(t;1;\max)=K\{[\Delta t(\text{percep};1)^2+2D/K]^{1/2} \pm \Delta t(\text{percep};1)\}. \quad (25)$$

If the parameter p=−1, corresponding to constant loss of energy during braking, Eq. (23) becomes a cubic relation $$(v(t;1))^3/3K+v(t;1)\cdot \Delta t(\text{percep};1)-D=0, \quad (26)$$

which has at least one real root and is solvable analytically. If the parameter p has some value other than p=0 or p=1, the maximum velocity v(t;1;max) may be estimated using a numerical equation solver that is incorporated in the software or hardware of the LD signal receiver/processor 15. A simple, and often sufficiently accurate, upper bound for the maximum vehicle clear-view velocity v(t;1;max) can be obtained by dropping either the first or the second term on the left in Eq. (23) to obtain $$v(t;1;\max) \leq \min\{[(2-p)\cdot K\cdot d]^{-(2-p)}, D/\Delta t(\text{percep};1)\}. \quad (27)$$

Figure 3:
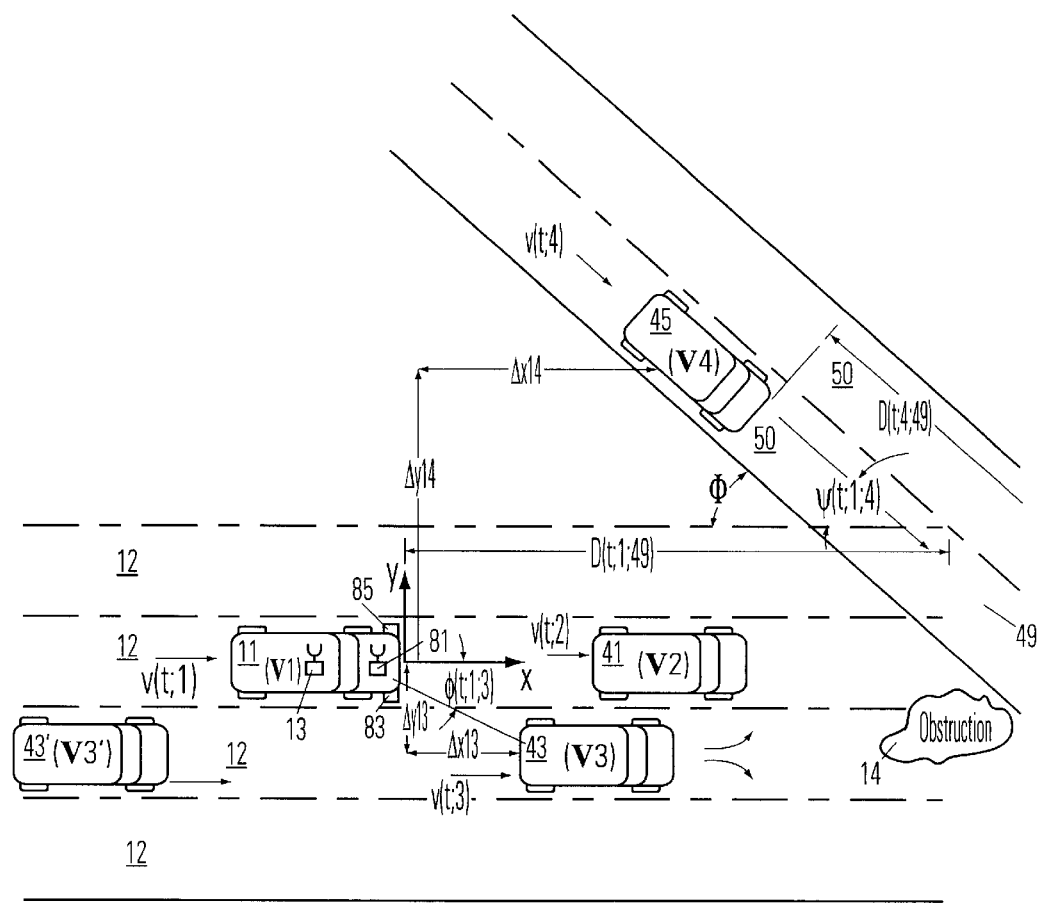

FIG. 3 illustrates an alternative embodiment, in which a first range/range rate determination module or "ranging" module 81, preferably a SONAR or RADAR transceiver, is mounted on the first vehicle 11 to illuminate a preceding second vehicle 41 or other object located to the front of the first vehicle. A second ranging module 83 is mounted toward the right side on the first vehicle 11 to illuminate vehicles located to the right of the first vehicle, such as a third vehicle 43 traveling in an adjacent parallel traffic lane on the road 12 in the same or opposite direction as the first vehicle for illustrative purposes. A third ranging module 85 is mounted toward the left side of the first vehicle 11 to illuminate vehicles located to the left of the first vehicle, such as a fourth vehicle 45 that is approaching an intersection 49 along an intersecting road 50 that the first vehicle will also soon pass through. In this embodiment, the system preferably includes an electronically perceptible map showing all roads and lanes of roads in a region where the first vehicle 11 operates. The second ranging module 83 and/or the third ranging module 85 can optionally be deleted, but preferably both of these modules are included in the system, to provide information on vehicles to the right and to the left of the first vehicle 11. The first ranging module 81 and/or the second ranging module 83 and/or the third ranging module 55 may be, but need not be, part of the LD module 13.

The second ranging module 83 estimates the distance d(t;1;3), closure rate ∂d(t;1;3)/∂t, bearing or observation angle φ(t;1;3) and bearing angle rate ∂φ(t;1;3)/∂t between the first vehicle 11 and the third vehicle 43 ("V3") and determines two-dimensional location coordinates (Δx13(t), Δy13(t)) of the third vehicle 43, relative to the first vehicle 11 ("V1") and relative to the moving xy-coordinate frame shown in FIG. 3, using the relations $$\Delta x13(t)=d(t;1;3)\cos \phi(t;1;3), \quad (28)$$

$$\Delta y13(t)=d(t;1;3)\sin \phi(t;1;3), \quad (29)$$

$$d(t;1;3)=\{\Delta x13(t)^2+\Delta y13(t)^2\}^{1/2}, \quad (30)$$

where the bearing angle φ(t;1;3) is measured positive in a counterclockwise direction.

After the closure rate ∂d(t;1;3)/∂t and the bearing angle rate ∂φ(t;1;3)/∂t are measured or otherwise determined, the rates of change of the relative coordinates are determined by the relations $$\partial \Delta x13/\partial t=\cos \phi(t;1;3)\partial d/\partial t-d(t;1;3)\sin \phi(t;1;3)\partial \phi/\partial t, \quad (31)$$

$$\partial \Delta y13/\partial t=\sin \phi(t;1;3)\partial d/\partial t+d(t;1;3)\cos \phi(t;1;3)\partial \phi/\partial t. \quad (32)$$

The time derivative ∂Δx13/∂t is examined, and the following standards are applied:

$$\text{if } \partial \Delta x13/\partial t \leq -v(t;1), \quad (33A)$$

V3 is approaching V1 (moving in the opposite direction) or V3 is stationary;

$$\text{if } -v(t;1) < \partial \Delta x13/\partial t \leq 0, \quad (33B)$$

V1 is overtaking V3 and moving in the same direction, if V3 is ahead of V1, and V3 is overtaking V1, if V1 is ahead of V3;

$$\text{if } \partial \Delta x13/\partial t > 0 \quad (33C)$$

and V1 and V3 are moving in the same direction; V3 is moving faster, if V3 is ahead of V1. The time derivative ∂Δy13/∂t is examined, and the following standards are applied:

$$\text{if } \partial \Delta y13/\partial t < -v_{y1}, \quad (34A)$$

V3 is likely changing its traffic lane toward the V1 lane;

$$\text{if } -v_{y1} \leq \partial \Delta y13/\partial \Delta t \leq v_{y2}, \quad (34B)$$

V3 is likely not changing its traffic lane or is stationary;

$$\text{if } \partial \Delta y13/\partial t > v_{y2}, \quad (34C)$$

V3 is likely changing its traffic lane away from the V1 lane. Small velocity thresholds $v_{y1}$ and $v_{y2}$, such as $v_{y1}=0.2$ meter/sec$^2$ and $v_{y2}=0.3$ meter/sec$^2$, are used in the conditions (34A), (34B) and (34C) to compensate for a small amount of vehicle "wander" within a lane that occurs and to compensate for a small movement of the third vehicle V3 to the right or to the left as V3 negotiates a right or left curve in the present V3 traffic lane.

The first, second and third velocity ranges set forth in Eqs. (33A), (33B) and (33C) may be changed modestly to reflect the particular circumstances of the situation represented in FIG. 3 for the first and third vehicles. Similarly, the first, second and third velocity ranges set forth in Eqs. (34A), (34B) and (34C) may be changed modestly to reflect the particular circumstances of the situation represented in FIG. 3 for the first and third vehicles. It is preferable that the first, second and third velocity ranges chosen for the variable ∂Δx13/∂t be substantially non-overlapping, in order to avoid ambiguity in assignment of this variable to precisely one of these ranges; and that the first, second and third velocity ranges chosen for the variable ∂Δy13/∂t be substantially non-overlapping, in order to avoid ambiguity in assignment of this variable to precisely one of these ranges.

The driver of the first vehicle 11 should be specially concerned if condition (34A) is present, indicating that the third vehicle 43 may be moving toward, or changing into, the first vehicle's lane. The driver of the first vehicle 11 would also be specially concerned if condition (33B) is satisfied and the time derivative $\partial\Delta x13/\partial t$ is rapidly decreasing toward the value $-v(t;1)$, indicating that the third vehicle 43 is rapidly decelerating, possibly to avoid an obstruction 14 or collision in the V3 traffic lane; the third vehicle 43 may abruptly move into the V1 traffic lane to avoid the obstruction 14 or collision. If $\partial\Delta x13/\partial t \approx -v(t;1)$, a subset of condition (33A), and condition (34B) is also present, it is likely that the third vehicle 43 or other object illuminated by the second RRD module 83 is stationary.

The second ranging module 83 can also be used to provide a "window" for the driver of the first vehicle 11 into a blind spot, such as a space to the right or and behind the first vehicle, where another vehicle V3' may be traveling, in the same direction as the first vehicle. For the vehicle V3', if the condition (33B) is satisfied, the vehicle V3' is overtaking the first vehicle 11 from the rear, but in a lane adjacent to the first vehicle traffic lane. In this instance, the driver of the first vehicle 11 should be advised, visually or audibly, that another vehicle is traveling in an adjacent lane and may be hidden from the first vehicle driver's present view.

The third ranging module 85 estimates the distance $d(t;1;4)$, closure rate $\partial d(t;1;4)/\partial t$, bearing angle $\phi(t;1;4)$ and bearing angle rate $\partial\phi(t;1;4)/\partial t$ between the first vehicle 11 and an object 45 and determines two-dimensional location coordinates $(\Delta x14(t),\Delta y14(t))$ of the fourth vehicle 45, relative to the first vehicle 11 ("V1") and relative to the moving xy-coordinate frame shown in FIG. 3, using the relations $$\Delta x14(t)=d(t;1;4)\cos\phi(t;1;4), \tag{35}$$

$$\Delta y14(t)=d(t;1;4)\sin\phi(t;1;4), \tag{36}$$

$$d(t;1;4)=\{\Delta x14(t)^2+\Delta y14(t)^2\}^{1/2}, \tag{37}$$

where the bearing angle $\phi(t;1;4)$ is measured positive in a counterclockwise direction. The rates of change of the relative coordinates $(\Delta x14,\Delta y14)$ are determined by the relations $$\partial\Delta x14/\partial t=\cos\phi(t;1;4)\partial d/\partial t-d(t;1;4)\sin\phi(t;1;4)\partial\phi/\partial t, \tag{38}$$

$$\partial\Delta y14/\partial t=\sin\phi(t,1;4)\partial d/\partial t+d(t;1;4)\cos\phi(t;1;4)\partial\phi/\partial t. \tag{39}$$

The system refers to its electronic map whenever another vehicle or other object 45 is determined to be present by a ranging module. Here, the system recognizes the presence of an object 45 that is located on or near a road 50 that intersects the road 12 traveled by the first vehicle 11 at an intersection 49 at an angle $\Phi$. If the object 45 is a moving vehicle, the measured or computed rates of change of the relative coordinates become $$\partial\Delta x14/\partial t=v(t;4)\cos\Psi(t;1;4)-v(t;1), \tag{40}$$

$$\partial\Delta y14/\partial t=v(t;4)\sin\Psi(t;1;4), \tag{41}$$

where the velocity $v(t;4)$ and the heading angle $\Psi(t;1;4)$ of the object 45 relative to the first vehicle 11 are not yet known. The system estimates the fourth vehicle velocity $v(t;4)$ by computing the quantity $$\{(\partial\Delta x14/\partial t+v(t;1))^2+(\partial\Delta y14/\partial t)^2\}^{1/2}=v(t;4)^2, \tag{42}$$

and computes the heading angle $\Psi(t;1;4)$ by computing the quantity $$\{\partial\Delta y14/\partial t\}/\{\partial\Delta x14/\partial t+v(t;1)\}\approx\tan\Psi(t;1;4). \tag{43}$$

If the quantity $v(t;4)^2$ computed in Eq. (37) is substantially greater than zero, the system concludes that the object 45 is a moving vehicle V4 and is not stationary. If the quantity $\tan\Psi(t;1;4)$ computed in Eq. (42) is approximately equal to the known tangent value $\tan\Psi$ for the intersecting road 50, the system concludes that the object 45 is likely a vehicle V4 traveling at a velocity of $v(t;4)=\pm|v(t;4)|$ along the intersecting road 50, away from or toward the intersection 49, where the plus sign (+) or the minus sign (−) is chosen according as $$\partial\Delta y14/\partial t>0 \text{ (plus sign: away from)} \tag{44A}$$

or $$\partial\Delta y14/\partial t<0 \text{ (minus sign: toward).} \tag{44B}$$

Where the quantity $v(t;4)^2$ computed in Eq. (34) is substantially zero, the system concludes that the object 45 is likely stationary and ignores its presence. Where the tangent value $\tan\Psi(t;1;4)$ computed in Eq. (43) does not satisfy $$\tan\Psi(t;1;3)\approx\tan\phi, \tag{45}$$

the system concludes that the fourth vehicle 45 is not moving on the (nearest) intersecting road 50; the system may or may not ignore the fourth vehicle 45 in this situation.

If $v(t;4)^2$ is substantially greater than zero and Eq. (45) is satisfied, the system estimates $v(t;4)$, using Eqs. (42), (44A) and (44B). Only situations where $v(t;4)<0$ are of interest here. The system then estimates the distances, $D(t;1;49)$ and $D(t;4,49)$, between the first vehicle 11 and the intersection 49 and between the fourth vehicle 45 and the intersection 49, respectively. The system also estimates the total stopping distances, $d(t;v(t;1);stop)$ and $d(t;v(t;4);stop)$, for the respective first and fourth vehicles, using Eq. (13) or some other suitable estimate. If the distance $D(t;4;49)$ satisfies the inequality $$D(t;4;49)-d(t;v(t;4);stop)>0, \tag{46}$$

the system concludes that the fourth vehicle 45 still has time to slow down for, or stop at, the intersection 49, and the system continues to monitor the location and velocity of the fourth vehicle. If the distance $D(t;4;49)$ satisfies the inequality $$D(t;4;49)-d(t;v(t;4);stop)\leq 0, \tag{47}$$

the system concludes that the fourth vehicle does not have sufficient time to significantly slow down for, or stop at, the intersection 49.

The system then optionally estimates the time interval length $\Delta t1$ required for the first vehicle to reach and "clear" (pass through) the intersection 49, using a relation such as $$\Delta t1=D(t;1;49)/v(t;1)+\Delta t(\text{clear}), \tag{48}$$

where $\Delta t(\text{clear})$ is a selected time interval length, such as 1–3 sec. The system also optionally estimates the time interval length $\Delta t4$ required for the fourth vehicle 45 to reach the intersection 49, using a relation such as $$\Delta t4=D(t;4;49)/|v(t;4)|. \tag{49}$$

The system optionally computes $\Delta t1-\Delta t4$. If this quantity is negative, or if the preceding development of the time interval lengths Δt1 and Δt4 is not included in the logic, the system immediately either (1) advises the driver of the first vehicle 11 that the fourth vehicle cannot or will not stop at the intersection 49 so that this driver can quickly respond or (2) automatically applies the brakes of the first vehicle to attempt to stop the first vehicle before the first vehicle reaches the intersection 49.

This last embodiment can also be applied to an intersection of a road 12 with railroad tracks 50, where the vehicle 45 is a locomotive or other railroad car in a moving train. In this situation, it is prudent to assume that the locomotive 45 will not stop; and the central question becomes whether the first vehicle 11 can reach and "clear" the intersection before the locomotive 45 reaches this intersection. If the road-railroad track intersection 49 has an associated rail crossing control mechanism, such as one or more gates that descend and block the flow of automobile traffic when a train approaches, another question that must be answered is whether the first vehicle 11 can "clear" the intersection 49 before the rail crossing control mechanism is activated and blocks the flow of auto traffic. This sort of information is best built into the LD module 13 so that the LD module can (1) identify the location and the road-rail intersection, (2) call up details from its library to determine what is the safety time interval (in advance of arrival of the locomotive) used for activating the railroad crossing mechanism, and (3) determine if the first vehicle can "clear" this intersection before the railroad crossing control mechanism is activated.

Figure 4:
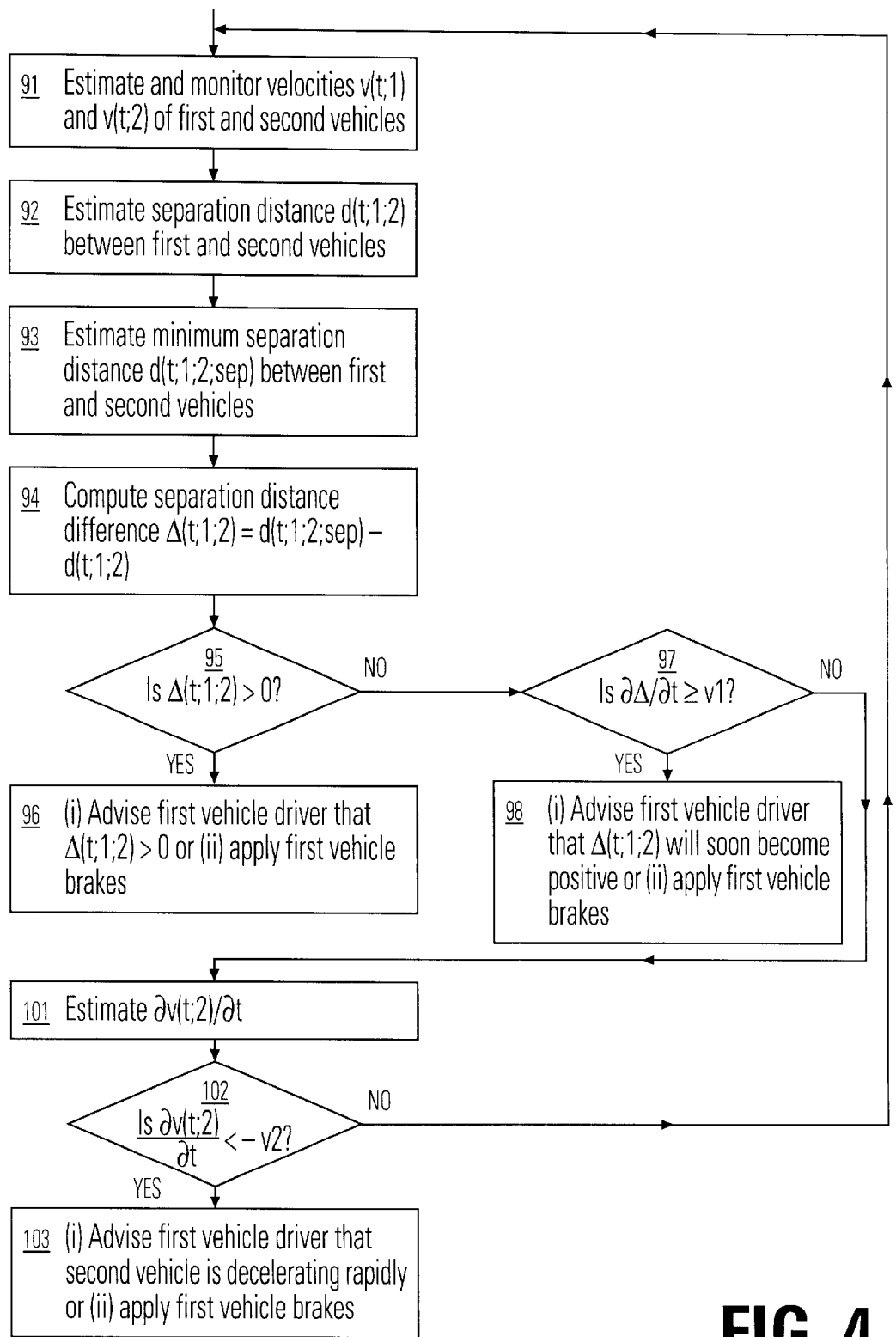
FIGS. 4, 5 and 6 are flowcharts illustrating procedures for practicing the invention.

FIG. 4 is a flow chart of a suitable procedure for implementing the vehicle-to-vehicle separation distance embodiment of the invention, using only the observed velocity v(t;1) of the first vehicle, or using the observed velocities v(t;1) and v(t;2) of the first and second vehicles, for the situation shown in FIG. 1. A system to practice the first embodiment of the invention will provide either the Total Stopping Distance in column 4 of Table 1, or the Perception-Reaction Distance and the Braking Distance set forth in columns 2 and 3, as a function of vehicle velocity. The system will further: (1) estimate and monitor the velocity magnitudes $v(t;1)=|v(t;1)|$ and $v(t;2)=|v(t;2)|$ of the first vehicle 11 and (optionally) second vehicle 41 as functions of time t, step 91 in the flow chart shown in FIG. 4; (2) estimate and monitor the actual separation distance d(t;1;2) between the first vehicle and a second vehicle, if any is visible, that moves immediately ahead of the first vehicle on the road in the same lane and in the same direction, in step 92; (3) estimate a minimum separation distance d(t;1;2;sep) between the first and second vehicles, based on the velocity v(t;1) and, optionally, on the velocity v(t;2), using interpolations between entries in a table, such as Table 1, where necessary, in step 93; (4) compute a separation distance difference $\Delta(t;1;2)=d(t;1;2;sep)-d(t;1;2)$, in step 94; (5) determine if $\Delta(t;1;2) \geq 0$, in step 95; (6) if $\Delta(t;1;2) \geq \ldots 0$, (i) advise the operator of the first vehicle that $\Delta(t;1;2) \geq 0$, or (ii) apply the first vehicle brakes, in step 96; (7) if $\Delta(t;1;2) <0$, determine whether the rate of change with time, $\partial \Delta(t;1;2)$, of $\Delta(t;1;2)$ is positive and is greater than a first selected threshold rate v1, in step 97; (8) if the answer to the question in step 97 is "no," continue with step 91, or continue to step 101; (9) if the answer to the question in step 97 is "yes," (i) advise the operator of the first vehicle that $\Delta(t;1;2)$ will soon become positive, or (ii) apply the first vehicle brakes, in step 98; (10) estimate the time derivative $\partial v(t;2)/\partial t$ for the second vehicle, in step 101; (11) determine if the time derivative $\partial v(t;2)/\partial t$ is less than a (negative) second selected threshold rate −v2, in step 102; (12) if the answer to the question in step 102 is "no," continue with step 91; (13) if the answer to the question in step 102 is "yes," (i) advise the first vehicle driver that the second vehicle is decelerating rapidly or (ii) apply the first vehicle brakes, in step 103.

Figure 5:
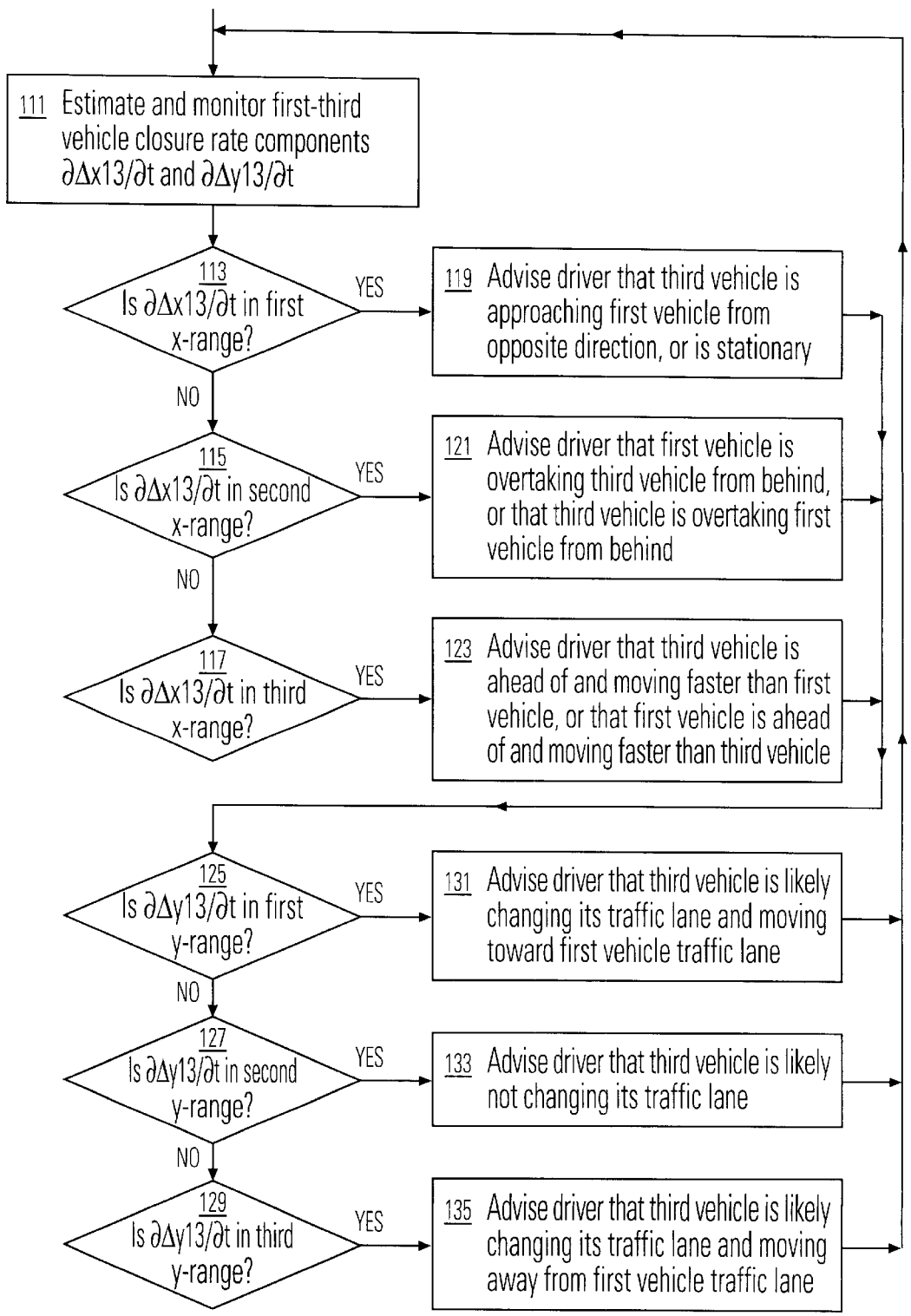

FIG. 5 is a flow chart of a suitable procedure for implementing the vehicle-to-vehicle separation distance embodiment of the invention, using the observed velocities v(t;1) and v(t;3) of the first vehicle (V1) and third vehicle (V3), for the situation shown in FIG. 3. In this embodiment: (1) the system estimates and monitors the first vehicle-third vehicle closure rate components $\partial \Delta x13/\partial t$ and $\partial \Delta y13/\partial t$ (Eqs. (31) and (32)), in step 111; (2) the system determines, in steps 113, 115 and 117, whether the first component $\partial \Delta x13/\partial t$ lies in a first x-range, in a second x-range or in a third x-range, as set forth in Eqs. (33A), (33B) and (33C), respectively; (3) if $\partial \Delta x13/\partial t$ lies in the first x-range, the system optionally advises the driver (of the first vehicle 11) that the third vehicle is approaching V1 from the opposite direction or is stationary, in step 119; (4) if $\partial \Delta x13/\partial t$ lies in the second x-range, the system, in step 121, optionally advises the driver that the first vehicle is overtaking the third vehicle from behind and moving in the same direction, if the third vehicle is ahead of the first vehicle, or that the third vehicle is overtaking the first vehicle from behind, if the first vehicle is ahead of the third vehicle; (5) if $\partial \Delta x13/\partial t$ lies in the third x-range, the system, in step 123, optionally advises the driver that the third vehicle is ahead of and is moving faster than the first vehicle, or the first vehicle is ahead of and moving faster than the third vehicle; the system then continues, from step 119 or 121 or 123, to step 125; (6) the system determines, in steps 125, 127 and 129, whether the second component $\partial \Delta y13/\partial t$ lies in a first y-range, in a second y-range or in a third y-range, as set forth in Eqs. (34A), (34B) and (34C), respectively; (7) if $\partial \Delta y13/\partial t$ lies the first y-range, the system optionally advises the driver that the third vehicle is likely changing its traffic lane and moving toward the first vehicle traffic lane, in step 131; (8) if $\partial \Delta y13/\partial t$ lies in the second y-range, the system optionally advises the driver that the third vehicle is likely not changing its traffic lane, in step 133; and (9) if $\partial \Delta y13/\partial t$ lies in the third y-range, the system optionally advises the driver that the third vehicle is likely changing its traffic lane away from the first vehicle traffic lane, in step 135; the system then returns to step 111 or some other suitable return step, from step 131 or 133 or 135.

Because the first, second and third x-ranges are exhaustive and mutually exclusive, one of the steps 113, 115 and 117 may be deleted. For example, if step 117 is eliminated, the system will pass directly from step 115 to step 123, if the answer to the question in step 115 is "yes." Because the first, second and third y-ranges are exhaustive and mutually exclusive, one of the steps 125, 127 and 129 may be deleted. For example, if step 129 is eliminated, the system will pass directly from step 127 to step 135, if the answer to the question in step 127 is "yes."

Figure 6:
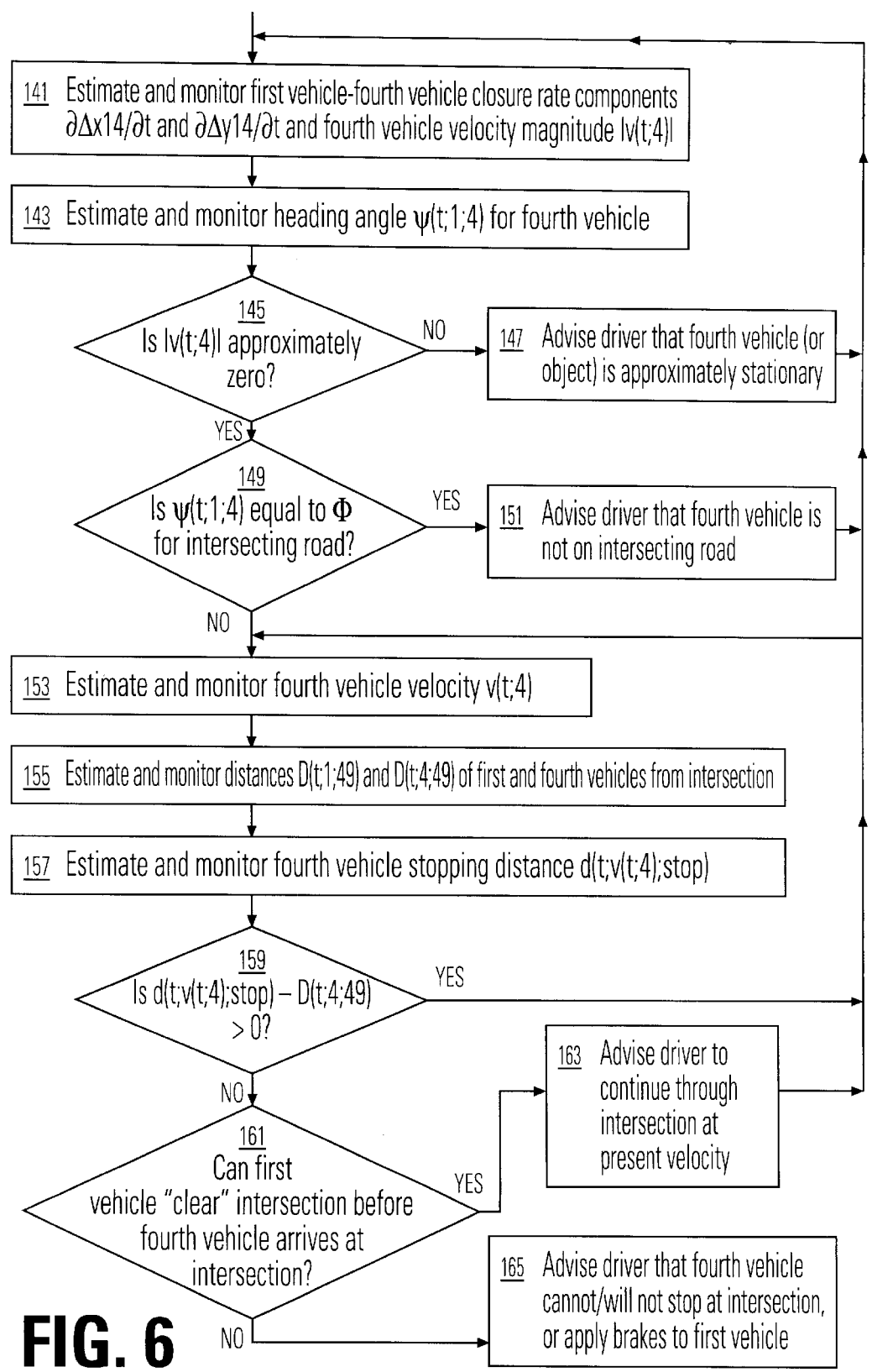

FIG. 6 is a flow chart of a suitable procedure for implementing the vehicle-to-vehicle separation distance embodiment of the invention, using the observed velocities v(t;1) and v(t;4) of the first vehicle (V1) and fourth vehicle (V4), for the situation shown in FIG. 3. In this embodiment: (1) the system estimates and monitors the first vehicle-object closure rate components, $\partial \Delta x14/\partial t$ and $\partial \Delta y14/\partial t$, the first vehicle velocity v(t;1) and the object velocity magnitude $|v(t;4)|$, in step 141; (2) the system estimates and monitors the object heading angle $\Psi(t;1;4)$, in step 143; (3) the system determines whether the object velocity magnitude $|v(t;4)|$ is approximately zero, in step 145; (4) if the answer to the question in step (3) is "yes," the system concludes that the object is approximately stationary, in step 147 (optional), and the system returns to step 141; (5) if the answer to the question in step 145 is "no," the system determines whether the heading angle Ψ(t; 1;4) is approximately equal to the heading angle Φ for the intersecting road, in step 149; (6) if the answer to the question in step 145 is "no," the system concludes that the object 45 is not traveling on the intersecting road 50, in step 151 (optional), and the system returns to step 141; (7) if the answer to the question in step 149 is "yes," the system estimates and monitors the velocity v(t;4) of the moving object or fourth vehicle, in step 153; (8) in step 155, the system estimates and monitors the distances D(t;1;49) and D(t;4;49) of the first and fourth vehicles from the intersection 49; (9) in step 157, the system estimates and monitors the fourth vehicle stopping distance d(t;v(t;4);stop); (10) in step 159, the system determines whether d(t;v(t;4);stop)−D(t;4;49)>0; (11) if the answer to the question in step 159 is "yes," the system returns to step 153 or to step 141; (12) if the answer to the question in step 159 is "no," the system optionally determines, in step 161, whether the first vehicle can reach and "clear" the intersection before the fourth vehicle arrives at the intersection; (13) if the answer to the question in step 161 is "yes," the system advises the driver (of the first vehicle) to continue through the intersection at present velocity, in step 163, and returns to either step 153 or to step 141; this assumes, of course, that the first vehicle is not required to stop at a stop sign or traffic control light at the intersection; (14) if the answer to the question in step 161 is "no," the system either (i) advises the driver that the fourth vehicle cannot or will not stop at the intersection, or (ii) automatically applies the brakes to the first vehicle to bring this vehicle to a stop at or before this vehicle reaches the intersection; the system then optionally returns to step 141.

The system may also take account of the weather conditions and road conditions in which a vehicle operates. The preceding discussion will apply to a road that is dry or damp but may need to be modified for a road that is wet or is covered with snow or ice. For a road that is wet, snowy or icy, Eq. (1) may need to be modified, by adding a fraction f of the dry road stopping distance to the total distance required to bring the vehicle to a stop. For a snowy or icy road, this fraction f may be larger than 1 so that the stopping distance for such road conditions is more than twice the stopping distance for a dry road. If the fraction f can be measured or estimated, the stopping distance can be increased by the fraction f by reducing the coefficient K(dry road) in Eq. (1), for example, by replacing this coefficient by the coefficient $$K(\text{non-dry})=K(\text{dry})/(1+f). \tag{45}$$

Use of a coefficient K(non-dry), as in Eq. (45), will increase the stopping distance of each of two consecutive vehicles and will increase the minimum stopping distance between the two vehicles. If the stopping distance for a wet, snowy or icy road cannot be modeled using a fractional increase relative to the dry road stopping distance, the non-dry stopping distance may need to be measured for different conditions and incorporated in an on-vehicle table.

Figure 7:
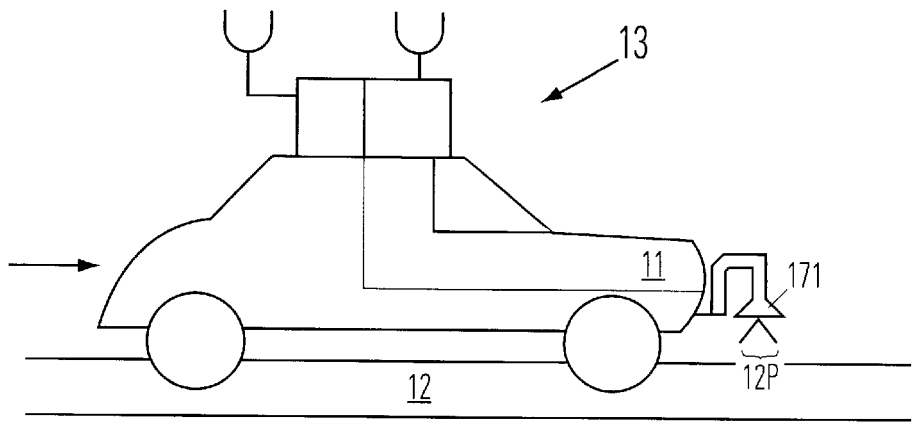
FIGS. 7 and 9 illustrate apparatus for determining vehicle road conditions.

Local road conditions can be estimated by an optical, infrared or other road condition sensor 171, mounted on a front or rear or side portion of the vehicle 11, that examines a small adjacent portion 12P of the road along which the vehicle passes, as illustrated in FIG. 7. Optionally, the sensor 171 can measure reflected light provided by a light source that uses an automatic light-sensing aperture, such as is now used on auto-exposure cameras available from Canon, Minolta, Pentax, Olympus and others.

Figure 8:
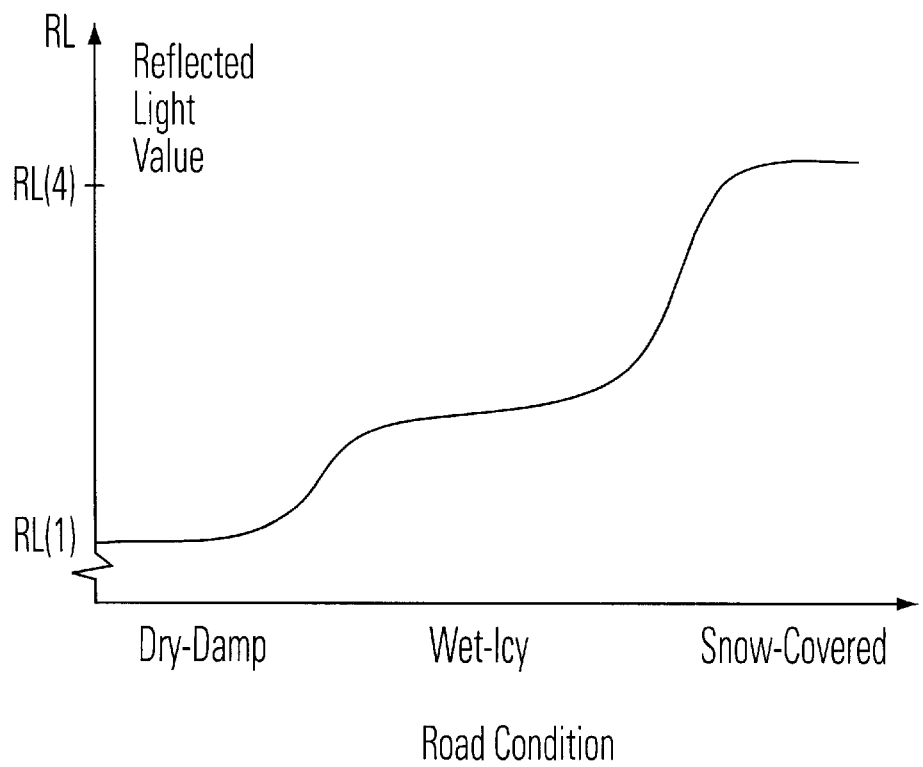
FIG. 8 graphically illustrates reflectivity versus road conditions.

The sensor 171 estimates the condition of the road portion 12P (which changes as the vehicle moves) and passes this information to the LD signal receiver/processor 15 for determination of minimum vehicle stopping distance or maximum vehicle clear-view velocity according to the preceding developments. If the sensor 171 uses a reflected light value RL, the sensor may determine whether the road is dry/damp, wet, snowy or icy, using the following algorithm, which is graphically illustrated in FIG. 8 for various road conditions. Note that RL is (usually) much higher for a snow-covered road than for other road conditions.

$$\text{if } 0<RL<RL(1), \text{ road is dry/damp}; \tag{46A}$$

$$\text{if } RL(1)<RL<RL(2), \text{ road is probably wet}; \tag{46B}$$

$$\text{if } RL(2)<RL<RL(3), \text{ road is probably icy}; \tag{46C}$$

$$\text{if } RL>RL(4), \text{ road is snow-covered}; \tag{46D}$$

where the parameters RL(j) (j=1, 2, 3, 4) are selected numerical values that have been determined empirically for the type of road on which the vehicle now moves. The LD signal receiver/processor 15 can receive and analyze the road condition information from the sensor and apply the appropriate value of the parameter K(dry) or K(non-dry) within a few milliseconds, before the vehicle has traveled more than, say, 30 cm along the road. Thus the vehicle 11 receives and acts upon real time information concerning local road conditions in determining the minimum vehicle-to-vehicle separation distance or the maximum vehicle velocity. Alternatively, a vehicle driver or passenger can enter the local road conditions manually into the LD module 13, for use in determining the appropriate value for the parameter K.

Preferably, the sensor 171 is adaptively trained on roads with differing conditions so that, after training, the sensor can reliably distinguish a dry or damp road, a wet road, an ice-covered road and a snow-covered road. Preferably, the sensor 171 is trained on various road surfaces, where the reflected light parameter RL may differ from one road to another for the same road conditions (for example, dry road versus dry road). Distinguishing between a wet road and an icy road for a given road segment may not be necessary if the coefficients K(non-dry) discussed above are quantitatively similar for these two conditions, or if a vehicle stopping is qualitatively similar for these two conditions.

Figure 9:
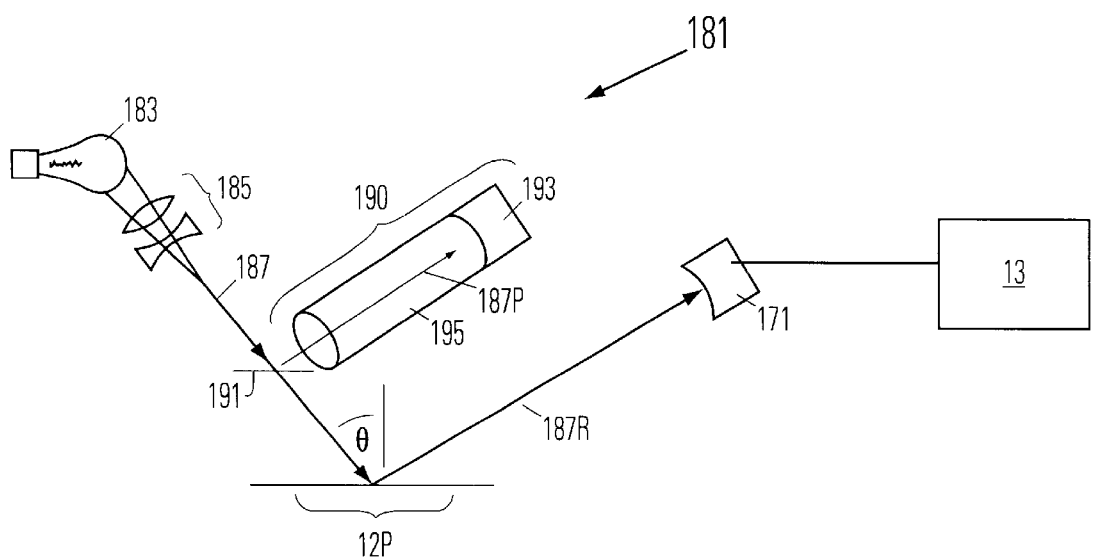

FIG. 9 illustrates, in more detail, apparatus 181 suitable for monitoring road conditions. A light source 183 produces ultraviolet, visible and/or infrared light or other suitable electromagnetic radiation, and a lens system 185 (optional) captures and directs a beam 187 of this light toward a portion 12P of a road 12 adjacent to a moving vehicle on which the apparatus 181 is carried. Preferably, the light beam 187 is not directed perpendicularly at the road portion 12P but is directed at a selected incidence angle θ that is substantially greater than 0° and is substantially less than 90°. The beam 187 of light is specularly and diffusely reflected from the road portion 12P, and part or all of the reflected light beam 187R is received by a light sensor 171 and used to estimate the condition of the road portion 12P illuminated by the light beam. The intensity of the reflected light beam 187R received by the sensor 171, or other relevant information obtained from receipt of the light beam, is delivered to, and processed by, the LD module 13 to estimate the local road conditions, as indicated by the response of the road portion 12P. For example, the intensity I(rcv) of the reflected light beam 187R can be divided by a reference light beam intensity I(ref) to form a ratio $$r(rcv)=I(rcv)/I(ref),\quad(47)$$

and the ratio r(rcv) can be used as the reflected light value RL to estimate the road conditions as in Eqs. (46A)–(46D). Alternatively, an intensity difference $$d(rcv)=I(ref)-I(rcv)\quad(48)$$

can be formed and used as the reflected light value RL to estimate the road conditions as in Eqs. (46A)–(46D).

If heavy fog or another visibility-reducing atmosphere is present, the light sensor 171 may sense a sharply reduced intensity of the reflected light beam 187R, or perhaps no light intensity at all. The light sensor and the LD module are arranged to recognize the presence of this situation and (optionally) to estimate and display a maximum clear-view vehicle velocity for the vehicle under these conditions, as discussed in the preceding. The ratio r(rcv), defined in Eq. (47), or the difference d(rcv), defined in Eq. (48), can be used to estimate light-absorbing characteristics of the ambient atmosphere and/or the maximum distance of visibility from the vehicle.

Presence of a visibility-reducing atmosphere should be distinguished from a situation in which the light beam source 183 and/or the light beam sensor 171 are malfunctioning. Optionally, a selected small portion 187P of the light beam 187 is split off by a light beam splitter 191 and is delivered to a second light beam sensor 193 as unreflected light. Information gleaned from receipt of the selected portion 187P of the light beam is also delivered to the LD module 13 for processing. Preferably, the selected portion 187P of the light beam 187 is delivered to the second light sensor 193 through a tube (optionally evacuated) or other light beam delivery means 195 that does not permit entry therein of any visibility-reducing atmosphere that may be present outside the vehicle. Thus, presence of a visibility-reducing atmosphere does not interfere with receipt of the selected portion 187P of the light beam by the second sensor 193.

If the second light beam sensor 193 does not register receipt of any light when this light beam monitoring sub-system 190 is activated, the system concludes that the light beam source 183 and/or the second light beam sensor 193 is malfunctioning. Optionally, the second light sensor 193 can coincide with the first light sensor 171, by allowing at most one of the reflected light beam 189 and the selected light beam portion 187P to be received at any time. For example, activation of this light beam monitoring sub-system may alternate with activation of the sub-system that receives and monitors the reflected light beam 187R. If the light beam monitoring sub-system 190 indicates that the light source 183 and the light sensor 193 (or 171) is operating properly, the LD module 13 treats the information it receives from the light sensor 171 as correct and acts accordingly. If the light beam monitoring sub-system 190 indicates that the light source 183 and/or the light sensor 193 (or 171) is not operating properly, optionally, the LD module can treat the information it receives from the light sensor 171 as possibly inaccurate and may process this information differently, or may ignore this information.

What is claimed is:

1. A method of monitoring operation of a first moving vehicle relative to a second moving vehicle on a road, the method comprising the steps of:

estimating the present velocity of said first moving vehicle using location determination (LD) signals received from two or more LD signal sources;

estimating a separation distance between said first and second moving vehicles, said second moving vehicle adjacent to and moving in the same general direction as said first moving vehicle in a selected road lane, using ranging signals received from a ranging signal source;

estimating a minimum separation distance between said first moving vehicle and said second moving vehicle, said minimum separation distance based on said present velocity of said first moving vehicle;

comparing said separation distance and said minimum separation distance; and providing a signal indicating that said separation distance between said first and second moving vehicles is less than said minimum separation distance, when said separation distance is no greater than said minimum separation distance;

providing a second signal indicating that s aid separation distance between said first and second moving vehicles will ultimately become less than said minimum separation distance when said separation distance is greater than said minimum separation distance and said separation distance while initially negative is becoming more positive at a greater than a selected threshold rate with respect to time.

2. The method of claim 1, wherein said step of estimating said minimum separation distance comprises the steps of:

estimating a braking distance required to bring said first moving vehicle to a stop from said present velocity;

estimating a driver perception-reaction time;

estimating a driver perception-reaction distance by multiplying the driver perception-reaction time by said present velocity of said first vehicle; and including the sum of the estimated braking distance and the estimated driver perception-reaction distance in said minimum separation distance for said first vehicle.

3. The method of claim 2, wherein said step of estimating said minimum separation distance further comprises the steps of:

estimating a road condition of said road, where said road condition is drawn from a class of conditions comprising dry road pavement, slightly wet road pavement, totally wetted road pavement, ice present on the road pavement, and snow present on the road pavement; and compensating in said estimation of said braking distance for said road condition.

4. The method of claim 3, wherein said step of compensating for said road condition comprises;

estimating said braking distance for said dry road pavement; and when said road condition is not said dry road pavement, increasing said braking distance by a selected fraction of said braking distance for said dry road pavement, where said fraction depends upon said road condition.

5. The method of claim 1, wherein said step of estimating said minimum separation distance comprises the steps of:

estimating a rate, dependent upon said present velocity, at which said present velocity will decrease when a braking action is applied to said first moving vehicle; and estimating said minimum separation distance as the distance required to bring said first moving vehicle to a stop after said braking action is first applied to said first moving vehicle based upon said rate.

6. A method of monitoring operation of a first moving vehicle relative to a second moving vehicle on a road, the method comprising the steps of:

estimating a first present velocity of said first moving vehicle using location determination (LD) signals received from two or more LD signal sources;

estimating a second present velocity of a second moving vehicle that moves in the same general direction as said first moving vehicle using ranging signals received from a ranging signal source;

estimating a separation distance between said first moving vehicle and said second moving vehicle using said ranging signals;

estimating a minimum separation distance between said first moving vehicle and said second moving vehicle, said minimum separation distance based on said first and second present velocities;

comparing said separation distance and said minimum separation distance; and providing a signal indicating that said separation distance between said first and second moving vehicles is less than said minimum separation distance, when said separation distance is no greater than said minimum separation distance;

providing a second signal indicating that said separation distance between said first and second moving vehicles will ultimately become less than said minimum separation distance when said separation distance is greater than said minimum separation distance and said separation distance while initially negative is becoming more positive at a greater than a selected threshold rate with respect to time.

7. The method of claim 6, wherein said step of estimating said minimum separation distance comprises the steps of:

estimating a first driver perception-reaction time;

estimating a first driver perception-reaction distance by multiplying said first driver perception-reaction time by said first present velocity;

estimating a first braking distance required to bring said first moving vehicle to a stop from said first present velocity;

estimating a second braking distance required to bring said second moving vehicle to a stop from said said present velocity; and computing the difference of said first driver perception-reaction distance plus said first braking distance minus said second braking distance, and interpreting this difference as said minimum separation distance.

8. The method of claim 7, wherein said step of estimating said minimum separation distance further comprises the steps of:

estimating a first rate, dependent upon said first present velocity, at which said first present velocity will decrease when a first braking action is applied to said first moving vehicle;

estimating said second rate, dependent upon said second present velocity, at which said second present velocity will decrease when a second braking action is applied to said second moving vehicle;

estimating said first braking distance required to bring said first moving vehicle to a stop after said first braking action is first applied to said first moving vehicle, based upon said first rate;

estimating a second braking distance required to bring said second moving vehicle to a stop after said second braking action is first applied to said second moving vehicle, based upon said second rate; and estimating said minimum separation distance as the sum of said first driver perception-reaction distance plus said first braking distance minus said second braking distance.

9. The method of claim 6, wherein said step of estimating said minimum separation distance further comprises the steps of;

estimating a road condition of said road, where said road condition is drawn from a class of conditions comprising dry road pavement, slightly wet road pavement, totally wetted road pavement, ice present on the road pavement, and snow present on the road pavement; and compensating in at least one of said estimation of said first braking distance and said second braking distance for said road condition.

10. The method of claim 9, wherein said step of compensating for said road condition comprises:

estimating said first braking distance and said second braking distance for said dry road pavement; and when said road condition is not said dry road pavement, increasing at least one of said first braking distance and said second braking distance by a selected fraction of said respective first and second braking distances for said dry road pavement, where said fraction depends upon said condition.

11. The method of claim 6, further comprising the steps of:

estimating a deceleration rate of said second moving vehicle;

comparing said deceleration rate with a selected threshold deceleration rate; and providing a third signal indicating that said second vehicle is decelerating rapidly when the deceleration rate is less than said selected threshold deceleration rate.

12. A system for monitoring operation of a first moving vehicle relative to a second moving vehicle on a road, the system comprising:

a location determination (LD) module, carried on said first moving vehicle, that receives LD signals from at least two LD signal sources and estimates a present location and present velocity of said first moving vehicle and a separation distance between said first moving vehicle and said second moving vehicle that precedes and moves in the same general direction as said first moving vehicle;

a computer, connected to or a part of said LD module, that is programmed to:

estimate a minimum separation distance between said first and second moving vehicles; and compare said separation distance and said minimum separation distance; and a display that provides a signal, in at least one of visually perceptible form and audibly perceptible form, indicating that said separation distance between said first and second moving vehicles is less than said minimum separation distance, when said separation distance is no greater than said minimum separation distance;

wherein said computer is programmed to cause said display to provide a second signal indicating that said separation distance between said first and second moving vehicles will ultimately become less than said minimum separation distance when said separation distance is greater than said minimum separation distance, but the difference between said minimum separation distance and said separation distance while initially negative is becoming more positive at greater than a selected threshold rate with respect to time.

13. The system of claim 12, wherein said computer estimates said minimum separation distance by including the steps of:
   estimating a braking distance required to bring said first moving vehicle to a stop from said present velocity;
   estimating a driver perception-reaction time;
   estimating a driver perception-reaction distance by multiplying said driver perception-reaction time by said present velocity of said first vehicle; and
   including the sum of said estimated braking distance and the estimated driver perception-reaction distance in said minimum separation distance for said first moving vehicle.

14. The system of claim 13, wherein said computer estimates said minimum separation distance by including the further steps of:
   estimating a road condition of said road, where said road condition is drawn from a class of conditions comprising dry road pavement, slightly wet road pavement, totally wetted road pavement, ice present on the road pavement, and snow present on the road pavement; and
   compensating in said estimation of said braking distance for said road condition.

15. The system of claim 14, wherein said computer compensates for said road condition by including the steps of:
   estimating said braking distance for said dry road pavement; and
   when said road condition is not said dry road pavement, causing said computer to increase said braking distance by a selected fraction of said braking distance for said dry road pavement, where said fraction depends upon said road condition.

16. The system of claim 15, further comprising a road pavement sensor, connected to said computer, that:
   examines a selected portion of road pavement adjacent to said first moving vehicle as said first moving vehicle moves along said road pavement; and
   estimates whether said selected portion of said road pavement is dry, slightly wet, wet, substantially covered with ice or substantially covered with snow.

17. The system of claim 12, wherein said computer estimates said minimum separation distance by including the steps of:
   estimating a rate, dependent upon said present velocity, at which said present velocity will decrease when a braking action is applied to said first moving vehicle; and
   estimating said minimum separation distance as the distance required to bring said first moving vehicle to a stop after said braking action is first applied to said first moving vehicle, based upon said rate.

18. The system of claim 12, wherein said computer is installed in said first moving vehicle and performs at least one function that is not related to monitoring said separation distance and said minimum separation distance.

19. The system of claim 12, wherein said system includes a data/command entry module, connected to said computer, that allows entry of at least one of an item of data and a command for said system to perform a selected task related to monitoring said separation distance and said minimum separation distance.

20. The systems of claim 12, further comprising at least one of the following, connected to said computer:
   a CD ROM player, carried on said first moving vehicle;
   a radio receiver that receives at least one of AM signals and FM signals, carried on said first moving vehicle;
   a fuel usage monitor, carried on said first moving vehicle; and
   a temperature monitor carried on said first moving vehicle.

21. The system of claim 12, wherein said first moving vehicle has a dashboard and at least one of said LD module, said computer, and said display is installed in said dashboard.

22. A system for monitoring operation of a first moving vehicle relative to a second moving vehicle on a road, the system comprising:
   a location determination (LD) module, carried on a first moving vehicle, that receives LD signals from at least two LD signal sources and estimates a first resent location and a first present velocity of said first vehicle;
   a ranging signal source located on said LD module that transmits and receives ranging signals to estimate a second present location and second present velocity $v(t;2)$ of said second moving vehicle that precedes and moves in the same general direction as said first moving vehicle, and a separation distance between said first moving vehicle and said second moving vehicle;
   a computer, connected to or a part of said LD module, that is programmed to:
      estimate a minimum separation distance between said first and moving vehicles; and
      compare said separation distance and said minimum separation distance; and
   a display that provides a signal, in at least one of visually perceptible form and audibly perceptible form, indicating that said separation distance between said first and second moving vehicles is less than said minimum separation distance, when said separation distance is no greater than said minimum separation distance;
   wherein said computer is programmed to cause said display to provide a second signal indicating that said separation distance between said first and second moving vehicles will ultimately become less than said minimum separation distance when said separation distance is greater than said minimum separation distance, but the difference between said minimum separation distance and said separation distance while initially negative is becoming more positive at greater than a selected threshold rate with respect to time.

23. The system of claim 22, wherein said computer estimates said minimum separation distance by including the steps of:
   estimating a first driver perception-reaction time;
   estimating a first driver perception-reaction distance by multiplying said first driver perception-reaction time by said first resent velocity;
   estimating a first braking distance required to bring said first moving vehicle to a stop from said first present velocity;
   estimating a second braking distance required to bring said second moving vehicle to a stop from said second present velocity; and
   computing the difference of said first driver perception-reaction distance plus said first braking distance minus said second braking distance, and interpreting this difference as said minimum separation distance.

24. The system of claim 23, wherein said computer further estimates said minimum separation distance by including the steps of:

estimating a first rate, dependent upon said first present velocity, at which said first present velocity will decrease when a first braking action is applied to said first moving vehicle.

estimating a second rate, dependent upon said second present velocity, at which said second present velocity will decrease when a second braking action is applied to said second moving vehicle;

estimating said first braking distance required to bring said first moving vehicle to a stop after said first braking action is first applied to said first moving vehicle, based upon said first rate;

estimating said second braking distance required to bring said second moving vehicle to a stop after said second braking action is first applied to said second moving vehicle, based upon said second rate; and estimating said minimum separation distance as the sum of said first driver perception-reaction distance plus said first braking distance minus said second braking distance.

25. The system of claim 23, wherein said computer estimates said minimum separation distance by including the steps of:

estimating a road condition of said road, where said road condition is drawn from a class of conditions comprising dry road pavement, slightly wet road pavement, totally wetted road pavement, ice present on the road pavement, and snow present on the road pavement; and compensating in at least one of said estimation of said first braking distance and said second braking distance for said road condition.

26. The system of claim 25, wherein said computer compensates for said road condition by including the steps of:

estimating said first braking distance and said second braking distance for said dry road pavement; and when said road condition is not said dry road pavement, increasing at least one of said first braking distance and said second braking distance by a selected fraction of said respective first and second braking distances for said dry road pavement, where said fraction depends upon said road condition.

27. The system of claim 22, wherein said computer is further programmed to:

estimate a deceleration rate of said second moving vehicle;

comparing said deceleration rate with a selected threshold deceleration rate; and providing a signal indicating that said second vehicle is decelerating rapidly when the deceleration rate is less than said selected threshold deceleration rate.

28. The system of claim 22, wherein said first moving vehicle has a dashboard and at least one of said LD module, said computer, and said display is installed in said dashboard.

* * * * *